US011928360B2

(12) United States Patent
Benisty et al.

(10) Patent No.: US 11,928,360 B2
(45) Date of Patent: Mar. 12, 2024

(54) COMMAND SLOT MANAGEMENT FOR MEMORY DEVICES

(71) Applicant: Western Digital Technologies, Inc., San Jose, CA (US)

(72) Inventors: Shay Benisty, Beer Sheva (IL); Karin Inbar, Ramat Hasharon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/177,647

(22) Filed: Feb. 17, 2021

(65) Prior Publication Data
US 2022/0164140 A1 May 26, 2022

Related U.S. Application Data

(60) Provisional application No. 63/116,326, filed on Nov. 20, 2020.

(51) Int. Cl.
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0653* (2013.01); *G06F 3/0679* (2013.01)

(58) Field of Classification Search
CPC .... G06F 3/0659; G06F 3/0604; G06F 3/0611; G06F 3/0653; G06F 3/0679
USPC ........................................................ 711/154
See application file for complete search history.

(56) References Cited

U.S. PATENT DOCUMENTS

| 7,263,596 B1 * | 8/2007 | Wideman | G06F 3/0631 709/215 |
| 8,255,618 B1 * | 8/2012 | Borchers | G06F 13/1642 710/24 |
| 8,321,627 B1 * | 11/2012 | Norrie | G06F 13/161 365/185.33 |
| 9,927,975 B2 | 3/2018 | Pratt | |
| 2013/0086352 A1 * | 4/2013 | Annepu | G06F 3/0613 711/170 |

(Continued)

OTHER PUBLICATIONS

Tallis, "NVMe 1.4 Specification Published: Further Optimizing Performance and Reliability," <https://www.anandtech.com/show/14543/nvme-14-specification-published/2> web page publicly available at least as early as Jun. 14, 2019.

*Primary Examiner* — Gautam Sain
(74) *Attorney, Agent, or Firm* — Michael Best & Friedrich LLP (57) ABSTRACT

A data storage device including a non-volatile memory device including one or more non-volatile memory sets and one or more endurance groups. Each of the endurance groups includes at least one of the non-volatile memory sets. The data storage device includes a controller coupled to the non-volatile memory device. The controller is configured to receive a pending command message from a host interface, where the received pending command message includes a command configured to be executed by a first endurance group of the number of endurance groups. The controller is further configured to determine an assigned command slot for storing the command, where the assigned command slot is selected form one of a private command slot pool associated with the first endurance group or a shared command slot pool, fetch the command from the host device, and store the fetched command in the assigned command slot.

20 Claims, 7 Drawing Sheets

(56) References Cited

U.S. PATENT DOCUMENTS

| | | | |
|---|---|---|---|
| 2015/0363331 A1* | 12/2015 | Yamamoto | G06F 12/0871 |
| | | | 711/133 |
| 2017/0295112 A1* | 10/2017 | Cheng | H04L 49/3036 |
| 2020/0104056 A1* | 4/2020 | Benisty | G06F 3/0688 |
| 2021/0042054 A1* | 2/2021 | Van Antwerpen | G11C 16/32 |
| 2022/0027268 A1* | 1/2022 | Dorsey | G06F 1/28 |

\* cited by examiner

COMMAND SLOT MANAGEMENT FOR MEMORY DEVICES

CROSS-REFERENCE TO RELATED APPLICATION

This application claims priority to and the benefit of U.S. Provisional Patent Application No. 63/116,326, filed on Nov. 20, 2020, the entire contents of which is incorporated herein by reference.

BACKGROUND

This application relates generally to memory devices, and more particularly, to a controller that manages command slot allocation across multiple memory devices or groups.

Non-volatile memory sets and endurance groups are high-level organizational constructs for managing pools of storage that are larger than an individual non-volatile memory namespace. Non-volatile memory sets consist of namespaces and unallocated storage. An endurance group is a collection of non-volatile memory sets and includes a pool of storage for wear leveling purposes. Each endurance group has a dedicated pool of spare memory blocks, which may be monitored for wear by a memory controller or other memory controlling device.

On memory devices with multiple endurance groups, it is possible to wear different endurance groups at different rates, such that one endurance group may wear out (e.g. forced to be read-only memory), while another endurance group is only lightly used. To address this, one or more memory controllers can map specific NAND dies or channels to different non-volatile memory ("NVM") sets or endurance groups, essentially splitting the dies and or channels into multiple relatively independent drives. This mapping provides for more balanced wear out of the associated dies and channels, and also rigidly partition performance.

Where endurance groups are supported, the device controller(s) must be responsible for allocating resources in order to meet performance and quality-of-service ("QoS") requirements while avoiding starvation and influence from one endurance group to other endurance groups. A critical and shared resource between endurance groups is the NVM command slots. Each command slot stores commands that were fetched from a host device and all related parameters associated with the command. The command slots are occupied by the fetched commands until the memory controller executes the commands.

SUMMARY

The number of these command slots for a given memory controller are limited and therefore must be managed carefully to prevent one or more endurance groups managed by the device controller from overusing memory slots, thereby limiting the availability of the command slots to other endurance groups. Thus, it is advantageous to effectively manage command slots available to multiple NVM sets and/or endurance groups according to the techniques described herein because the techniques described herein improve performance and QoS of endurance groups within a memory device by efficiently and equitably managing command slot resources used by the endurance groups. By managing the command slot resources, overuse of command slot resources by one or more endurance groups can be reduced or eliminated, thereby preventing command slot resource starvation experienced by other endurance groups.

One embodiment of the present disclosure includes a data storage device including a non-volatile memory device and a controller. The non-volatile memory device includes one or more non-volatile memory sets and one or more endurance groups. The one or more endurance groups include at least one non-volatile memory set. The controller is coupled to the non-volatile memory device and is configured to receive a pending command message from a host interface, wherein the pending command message include a command configured to be executed by a first endurance group of the one or more endurance groups. The controller is also configured to determine an assigned command slot for storing the command. The assigned command slot is selected from one of a private command slot pool associated with the first endurance group or a shared command slot pool. The controller is also configured to fetch the command from the host device, and store the received command in the assigned command slot.

Another embodiment of the present disclosure includes a method performed by a controller coupled to a non-volatile memory device. The method includes receiving a pending command message from a host interface, wherein the pending command message includes a command configured to be executed by a first endurance group of the one or more endurance groups. The method also includes determining an assigned command slot for storing the command, wherein the assigned command slot is selected from one of a private command slot pool associated with the first endurance group or a shared command slot pool. The method also includes fetching the command from the host device, and storing the received command in the assigned command slot.

Another embodiment of the present disclosure includes an apparatus. The apparatus includes means for means for receiving a pending command message from a host interface. The received pending command message includes a command configured to be executed by a first endurance group of the one or more endurance groups. The apparatus also includes a means for determining an assigned command slot for storing the command, wherein the assigned command slot is selected from one of a private command slot pool associated with the first endurance group or a shared command slot pool. The apparatus includes means for fetching the command from the host device, and storing the received command in the assigned command slot.

Various aspects of the present disclosure provide for improvements in memory devices. For example, managing command slots used my multiple NVM sets and/or endurance groups. Managing may include command slot allocation, as well as command slot release. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, etc.

Figure 1:
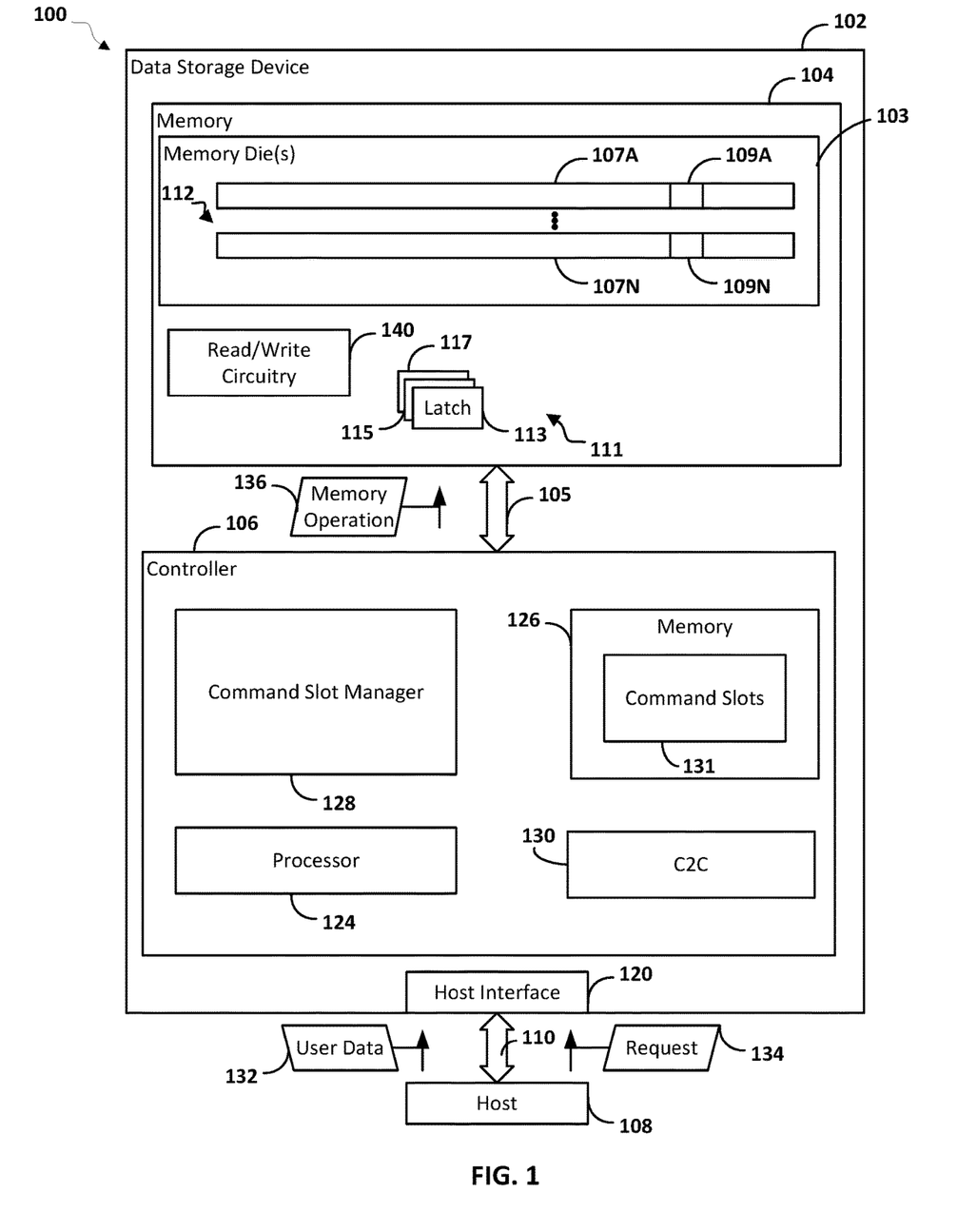
FIG. 1 is block diagram of one example of a system including a data storage device, according to some embodiments.

FIG. 1 is a block diagram of one example of a system 100 that includes command slot management, in accordance with some embodiments of the disclosure. In the example of FIG. 1, the system 100 includes a data storage device 102 and a host device 108. The data storage device 102 includes a controller 106 and a memory device 104 (e.g. non-volatile memory) that is coupled to the controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled via a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 108 via the communication path 110, such as a wired communication path and/or a wireless communication path. For example, the data storage device 102 may include an interface 120 (e.g., a host interface) that enables communication via the communication path 110 between the data storage device 102 and the host device 108, such as when the interface 120 is communicatively coupled to the host device 108.

The host device 108 may include a processor and a memory. The memory may be configured to store data and/or instructions that may be executable by the electronic processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data, such as user data 132, to be stored at the memory device 104 or to request data to be read from the memory device 104. The host device 108 may include a mobile smartphone, a music player, a video player, a gaming console, an electronic book reader, a personal digital assistant (PDA), a computer, such as a laptop computer or notebook computer, any combination thereof, or other suitable electronic device.

The host device 108 communicates via a memory interface that enables reading from the memory device 104 and writing to the memory device 104. In some examples, the host device 108 may operate in compliance with an industry specification, such as a Universal Flash Storage (UFS) Host Controller Interface specification. In other examples, the host device 150 may operate in compliance with one or more other specifications, such as a Secure Digital (SD) Host Controller specification or other suitable industry specification. The host device 108 may also communicate with the memory device 104 in accordance with any other suitable communication protocol.

The memory device 104 of the data storage device 102 may include a non-volatile memory (e.g., NAND, BiCS family of memories, or other suitable memory). In some examples, the memory device 104 may be any type of flash memory. As described in more detail below, the memory device 104 may include one or more memory devices, as described below. For example, the memory device 104 may be two-dimensional (2D) memory or three-dimensional (3D) flash memory. The memory device 104 may include one or more memory dies 103. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory device 104 may include support circuitry, such as read/write circuitry 140 to support operation of the one or more memory dies 103. Although depicted as a single component, the read/write circuitry 140 may be divided into separate components of the memory device 104, such as read circuitry and write circuitry. The read/write circuitry 140 may be external to the one or more memory dies 103 of the memory device 104. Alternatively, one or more individual memory dies may include corresponding read/write circuitry that is operable to read from and/or write to storage elements within the individual memory die independent of any other read and/or write operations at any of the other memory dies. The memory device 104 may further include one or more latches (e.g., a set of latches 111 including latches 113, 115, and 117).

The data storage device 102 includes the controller 106 coupled to the memory device 104 (e.g., the one or more memory dies 103) via a bus 105, an interface (e.g., interface circuitry), another structure, or a combination thereof. For example, the bus 105 may include multiple distinct channels to enable the controller 106 to communicate with each of the one or more memory dies 103 in parallel with, and independently of, communication with the other memory dies 103. In some implementations, the memory device 104 may be a flash memory.

The controller 106 is configured to receive data and commands from the host device 108 and to send data to the host device 108. For example, the controller 106 may send data to the host device 108 via the interface 120, and the controller 106 may receive data from the host device 108 via the interface 120. The controller 106 is configured to send data and commands (e.g., the memory operation 136, which may be a command provided to the memory device 104) to the memory device 104 and to receive data from the memory device 104. For example, the controller 106 is configured to send data and a write command to cause the memory device 104 to store data to a specified address of the memory device 104. The write command may specify a physical address of a portion of the memory device 104 (e.g., a physical address of a word line of the memory device 104) that is to store the data.

The controller 106 is configured to send a read command to the memory device 104 to access data from a specified address of the memory device 104. The read command may specify the physical address of a region of the memory device 104 (e.g., a physical address of a word line of the memory device 104). The controller 106 may also be configured to send data and commands to the memory device 104 associated with background scanning operations, garbage collection operations, and/or wear-leveling operations, or other suitable memory operations.

The controller 106 may include processor 124, a memory 126, a command slot manager 128, and a chip-to-chip interface 130. The memory 126 may be configured to store data and/or commands that may be executable by the processor 124. In one embodiment, the commands are stored in one or more command slots 131.

The controller 106 may send the memory operation 136 (e.g., a read command) to the memory device 104 to cause the read/write circuitry 140 to sense data stored in a storage element. For example, the controller 106 may send the read command to the memory device 104 in response to receiving a request for read access from the host device 108. In response to receiving the read command, the memory device 104 may sense the storage element 107A (e.g., using the read/write circuitry 140) to generate one or more sets of bits representing the stored data.

The command slot manager 128 may manage command slot allocation between endurance groups. As will be described in more detail below, the command slot manager 128 manages both command slot requests and command slot releases. The command slot manager 128 manages shared command slot pools and private command slot pools for multiple endurance groups and is responsible for allocation of command slots between endurance groups. The number of command slots for a given controller 106 may be 512. However, the controller 106 may have more than 512 command slots or less than 512 command slots. Generally, command slots are resource intensive and expensive, and therefore managing command slots is critical. In one embodiment, each command slot is 256 bytes in size. In other embodiments, the command slot is 512 bytes in size.

The chip-to-chip interface 130 is configured to interface the controller 106 with one or more other controllers, similar to controller 106, and/or other data storage devices. The chip-to-chip interface 130 may be used where multiple data storage devices are integrated into a device or system, such as a solid-state drive (SSD) or enterprise storage device (ESD).

Figure 2:
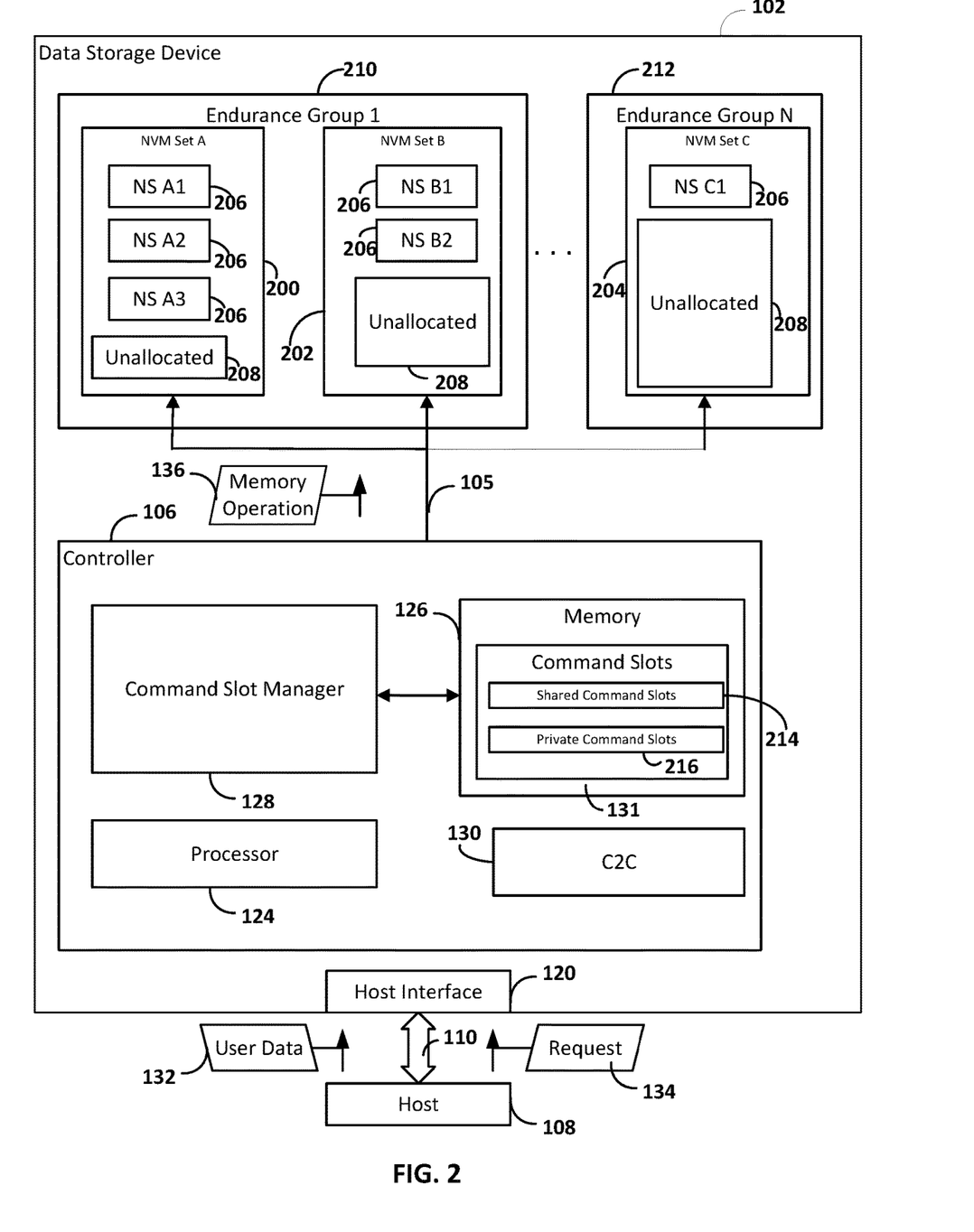
FIG. 2 is a block diagram of a memory device controller for controlling one or more endurance groups, according to some embodiments.

Turning now to FIG. 2, an example of the data storage device 102 of FIG. 1 is shown wherein the controller 106 of FIG. 1 is in communication with multiple NVM sets 200, 202, 204. The NVM sets 200, 202, 204 are made up of non-volatile memory, such as one or more memory dies 103, or memory devices 104, as described above. Each NVM set 200, 202, 204 includes one or more namespaces 206. The namespaces 206 are a quantity of the non-volatile memory within the respective NVM sets 200, 202, 204 that has been formatted into logical blocks. The controller 106 transmits and receives data from the NVM sets 200, 202, 204 via bus 105, as described above. Specifically, namespaces are generated when a storage device, such as data storage device 102, is configured using the non-volatile memory express ("NVMe") protocol, as is known in the art. Each namespace 206 can support, and may include, multiple memory blocks. When coupled with appropriate NVMe drivers, namespaces in a device (e.g. SSD) appear as standard memory block devices and a file system and applications may be deployed without additional modification. In one embodiment, an NVM set includes a collection of namespaces that generally share similar attributes (e.g. data granularity), metadata size, etc. The NVM sets 200, 202, 204 further include unallocated regions 208, which consist of NVM that is not yet allocated to a namespace 206. In one embodiment, the host device 108 generates namespaces based on capability of the host device 108 and/or the data storage device 102. Further, namespaces may be modified over time based on commands from the host device. In other examples, the generated namespaces may be static once initially generated. It is understood that namespaces are collections of logical block addresses accessible to a host device, such as host device 108.

The NVM sets 200, 202, 204 may further be grouped into endurance groups, such as a first endurance group 210, and a second endurance group 212. As shown in FIG. 2, the first endurance group 210 includes NVM sets 200 and 202, and the second endurance group 212 includes NVM set 204. Endurance groups are generally configured to communicate how the controller 106 manages endurance across the memory device 104 for a group of NVM sets, such as NVM sets 200, 202, 204, and the namespaces 206 inside the NVM sets. The endurance groups 210, 212 may be configured to behave like independent memory devices within the memory device 104. In some embodiments, each endurance group 210, 212 can broadcast a minimal performance and guaranteed quality of service ("QoS") that is supported by the endurance group to the controller 106 and/or the host device 108. In one embodiment, the controller 106 manages the endurance groups and can provide the performance and QoS information to other devices, such as host device 108.

While the controller 106 is shown to be controlling both the first endurance group 210 and the second endurance group 212, it is understood that the controller 106 may control more than two endurance groups (e.g., any N number of endurance groups). Furthermore, the controller 106 may interface with other controllers via the C2C 130. The C2C 130 allows for multiple endurance groups on different data storage devices to be managed by multiple controllers within a given environment or application. In one example, a controller, such as controller 106, acts as the master controller and interfaces with the host device 108. Subsequent controllers coupled to the controller 106 via the C2C 130 and are subordinate to the controller 106, whereby the controller 106 facilitates all communication between the host device 108 and the subordinate controllers.

During operation, the host device 108 provides commands to the data storage device 102, which are fetched by the controller 106 and stored in the command slots 131 of the memory 126. The command slots 131 may include shared command slots 214 and private command slots 216. In one example, the memory 126 includes 512 command slots. However, in other examples, the memory 126 may include more than 512 command slots or fewer than 512 command slots. In one embodiment, each endurance group 210, 212 may have a set number of private command slots. For example, each endurance group 210, 212 may have 64 private command slots 216. However, the endurance groups 210, 212 may have more than 64 private commands slots 216 or fewer than 64 private command slots 216. In one embodiment, each endurance group 210, 212 includes the same number of private command slots. In other embodiments, the number of private command slots for each endurance group 210, 212 may be allocated separately. In some embodiments, the controller 106, such as via the command slot manager 128, may allocate private command slots based on the number of endurance groups associated with the controller 106. The shared command slots 214 may be used by either endurance groups, as will be described in more detail below. In one embodiment, the command slot manager 128 controls how the shared command slots are allocated between the endurance groups 210, 212, as will be described in more detail below.

Command slots are critical resources that are shared between the different endurance groups, such as endurance groups 210, 212, and therefore to ensure that performance and QoS can be maintained, the command slots may be actively managed to ensure that one endurance group does not affect the performance and/or QoS of another endurance group, such as by utilizing a disproportionate number of command slots. Thus, a command slot manager, such as command slot manager 128, is provided to manage how the command slots are allocated between various endurance groups. While the command slot manager 128 is shown as being located independently within the controller 106, it is contemplated that the command slot manager 128 may be located within the memory 126 and executed via the processor 124.

Figure 3:
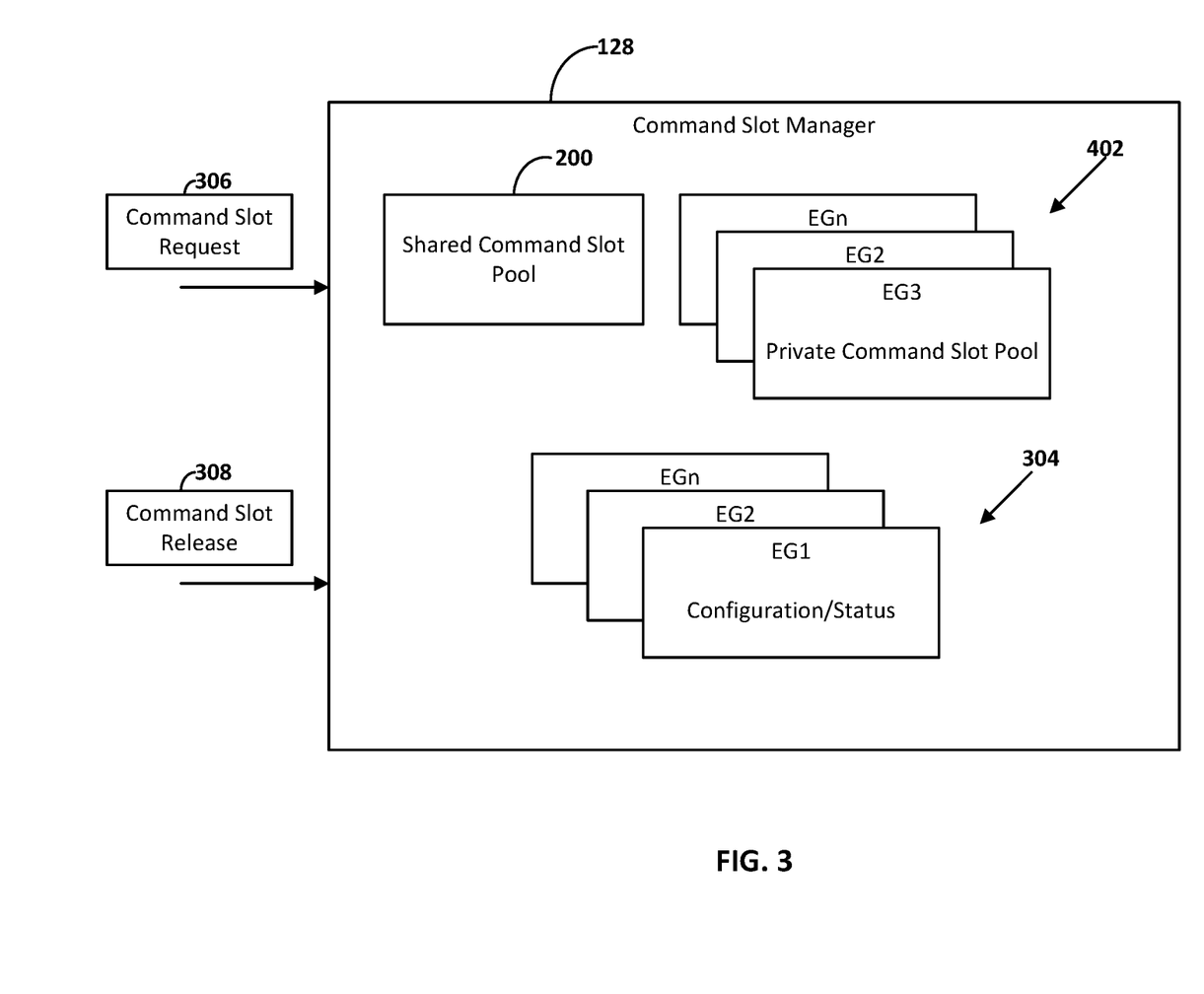
FIG. 3 is a block diagram of a command slot manager for managing control slots, according to some embodiments.

Turning now to FIG. 3, a block diagram illustrating an example configuration of the command slot manager 128 is shown, according to some embodiments. The command slot manager 128 includes a shared command slot pool 300, one or more private command slot pools 302, and one or more configuration/status blocks 304. The shared command slot pool 300 may reflect the shared command slots 214 described above, and the private command slot pools 302 may reflect the allocation of the private command slots 218 described above. For example, the shared command slot pool 300 reflects all of the available shared command slots that are available for use by any of the endurance groups associated with the controller 106. The private command slot pools 302 reflects a number of private command slots that are allocated for use exclusively by each endurance group, such as endurance groups 210, 212. In one embodiment, the command slot manager 128 is configured to perform all allocations of private command slots to respective endurance groups, and controls allocation of shared command slots, as will be described in more detail below.

The configuration/status blocks 304 may include configuration data and status information for each endurance group managed by the controller 106 associated with the command slot manager 128. For example, the command slot manager 128 may include a configuration/status block 304 for both the first endurance group 210 and the second endurance group 212. The configuration data may include thresholds for maximum outstanding commands, max timing, etc. The status information may include current number of outstanding commands for the endurance group, timing (e.g. time to execute and release a command), and the like. In one embodiment, the configuration and status information may be used to allocate command slots to the different endurance groups.

In one embodiment, the command slot manager 128 is in communication with the command slots 131 in the memory 126, such that the command slot manager 128 can allocate incoming commands from the host device 108 to one of the command slots 131. The command slot manager 128 may further be in communication with the processor 124, which may provide the information from the host device 108 (e.g. commands) to the command slot manager 128. In one embodiment, the command slot manager 128 receives command slot requests 306. Command slot requests 306 may be provided to the command slot manager 128 from the host device 108. In one example, the processor 124 provides the command slot requests 306 to the command slot manager 128 based on a command fetched from the host device 108. The command slot manager 128 may further receive command slot release requests 308. Command slot release requests 308 may be communicated to the command slot manager 128, such as by the processor 124, in response to command being completed by one of the endurance groups. Based on the received requests, the command slot manager 128 allocates one or more commands slots and/or releases one or more command slots, which is communicated to the command slots 131 within the memory 126.

Figure 4:
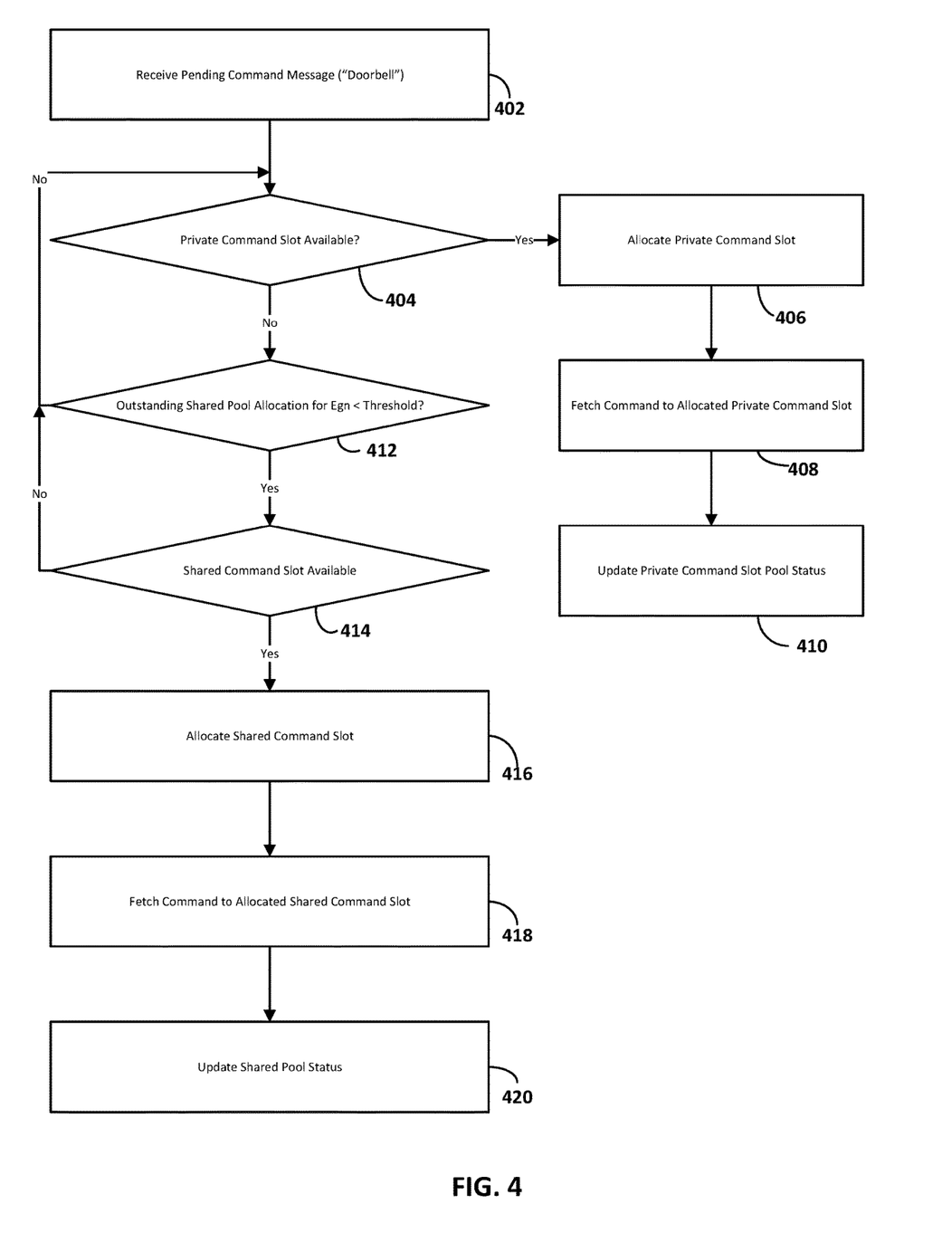
FIG. 4 is a flow chart illustrating a process for allocating command slots between multiple endurance groups, according to some embodiments.

Turning now to FIG. 4, a process or method 400 for allocating command slots in a memory device, such as memory device 104, is shown, according to some embodiments. Due to the limited number of command slots within a controller 106, it is important to ensure that one or more endurance groups do not monopolize the available command slots that must be shared by every endurance group within a given data storage device. Otherwise, if one endurance group is allowed to monopolize the available command slots, the other endurance groups within the data storage device may be starved for command slots, resulting in reduced performance and/or QoS.

As illustrated in FIG. 4, a doorbell or pending command message is received at the controller 106 at block 402. A doorbell is a message sent by a host device, such as host device 108, to a data storage device, such as data storage device 102, that a command (or commands) are pending in a command queue and that are waiting to be fetched by the data storage device (such as via the controller 106). In one embodiment, the doorbell is transmitted by the host device 108. The doorbell may be received by the command slot manager 128. In other embodiments, the doorbell may be received by the controller and communicated to the command slot manager 128, such as via the processor 124. The doorbell may include information such as a target endurance group, a target memory location, etc. In other embodiments, the controller 106 and/or the processor 124 is configured to analyze the doorbell and determine a target endurance group or memory location for the command.

In response to receiving the doorbell, the command slot manager 128 determines whether any private command slots associated with the target endurance group are available at block 404. For example, the command slot manager 128 may determine if the private command slot pool for the target endurance group has one or more available command slots. In response to determining that one or more private command slots are available for the target endurance group, the command slot manager 128 allocates a private command slot from a private command slot pool associated with the target endurance group to the received command and assigns the command to the allocated private command slot at block 406. Allocating the private command slot may include determining a memory location of the private command slot, which can be communicated to the controller 106 and/or processor 124. The command is then fetched and stored in the allocated private command slot at block 408. In one embodiment, the command slot manager 128 fetches the command, such as from the host device 108, and stores the command in the allocated private command slot. In other embodiments, the processor 124 fetches the command, and stores the command in the allocated private command slot, in response to receiving the allocated private command slot from the command slot manager 128. The command slot manager 128 then updates a private command slot pool status for the private command slot pool associated with the target endurance group at block 410. For example, the command slot manager 128 may update a quantity of available private command slots available in the private command slot pool associated with the target endurance group. In some instances, the command slot manager 128 may update a configuration/status block, such as configuration/status block 304, with an updated number of command slots currently in use by the target endurance group. In some example, the updated status may include an updated number of available private command slots, a timestamp of when the last private command slot was allocated, addresses of all currently allocated private command slots, etc.

In response to the command slot manager 128 determining that no private command slots are available for the target endurance group at block 404, the command slot manager 128 then determines whether the number of shared command slots allocated to the target endurance group (e.g. allocated to commands associated with the target endurance group) is below a threshold value. The threshold value may be based on a distribution of the available shared command slots over the number of endurance groups associated with the controller 106. For example, the shared command slots may be divided evenly over the number of associated endurance groups. In other examples, the shared command slots may be divided between the endurance groups based on one or more parameters or attributes of the endurance group. For example, an endurance group including multiple NVM sets may receive a higher allocation of shared command slots than an endurance group including only a single NVM set. However, other endurance group factors, such as time to release commands, activity, etc., may determine the allocation of shared pool command slots between different endurance groups. In one embodiment, the command slot manager 128 allocates the shared command slots within the shared command slot pool to different endurance groups. In other embodiments, the processor 124 and/or host device 108 may allocate the shared command slots within the shared command slot pool. Accordingly, the threshold is equal to the maximum number of shared slots available to the endurance group.

In response to determining that the number of shared command slots allocated to the target endurance group is not below the threshold value, the command slot manager 128 denies access to the shared command slot pool and determines whether any private command slots allocated to the target endurance group have become available at block 404. In response to determining that the number of shared command slots allocated to the target endurance group is below the threshold value, the command slot manager 128 determines if any shared command slots in the shared command slot pool are available at block 414. Available is understood to mean a shared command slot that is not currently storing or assigned a command. In response to determining that there are no shared command slots are available, the command slot manager 128 determines if any private slots allocated to the target endurance group have become available at block 404.

In response to determining that there are available shared command slots, the command slot manager 128 allocates one of the available shared command slots to the received command at block 416. Allocating the shared command slot may include determining a memory location of the shared command slot, which can be communicated to the controller 106 and/or processor 124 for processing. The command is then fetched and stored in the allocated shared command slot at block 418. In one embodiment, the command slot manager 128 fetches the command, such as from the host device 108, and stores the command in the allocated shared command slot. In other embodiments, the processor 124 fetches the command, and stores the command in the allocated shared command slot, based on receiving the allocated shared command slot from the command slot manager 128. The command slot manager 128 then updates a shared command slot pool status for the shared command slot pool at block 420. For example, the command slot manager 128 may update a quantity of available shared command slots available in the shared command slot pool. The command slot manager 128 may also update a configuration/status block, such as configuration/status block 304, with an updated number of shared pool command slots allocated to the target endurance group. Additionally, the updated status may also include an updated number of available shared command slots, a timestamp of when the last shared command slot was allocated, addresses of all currently allocated shared command slots, etc.

Figure 5:
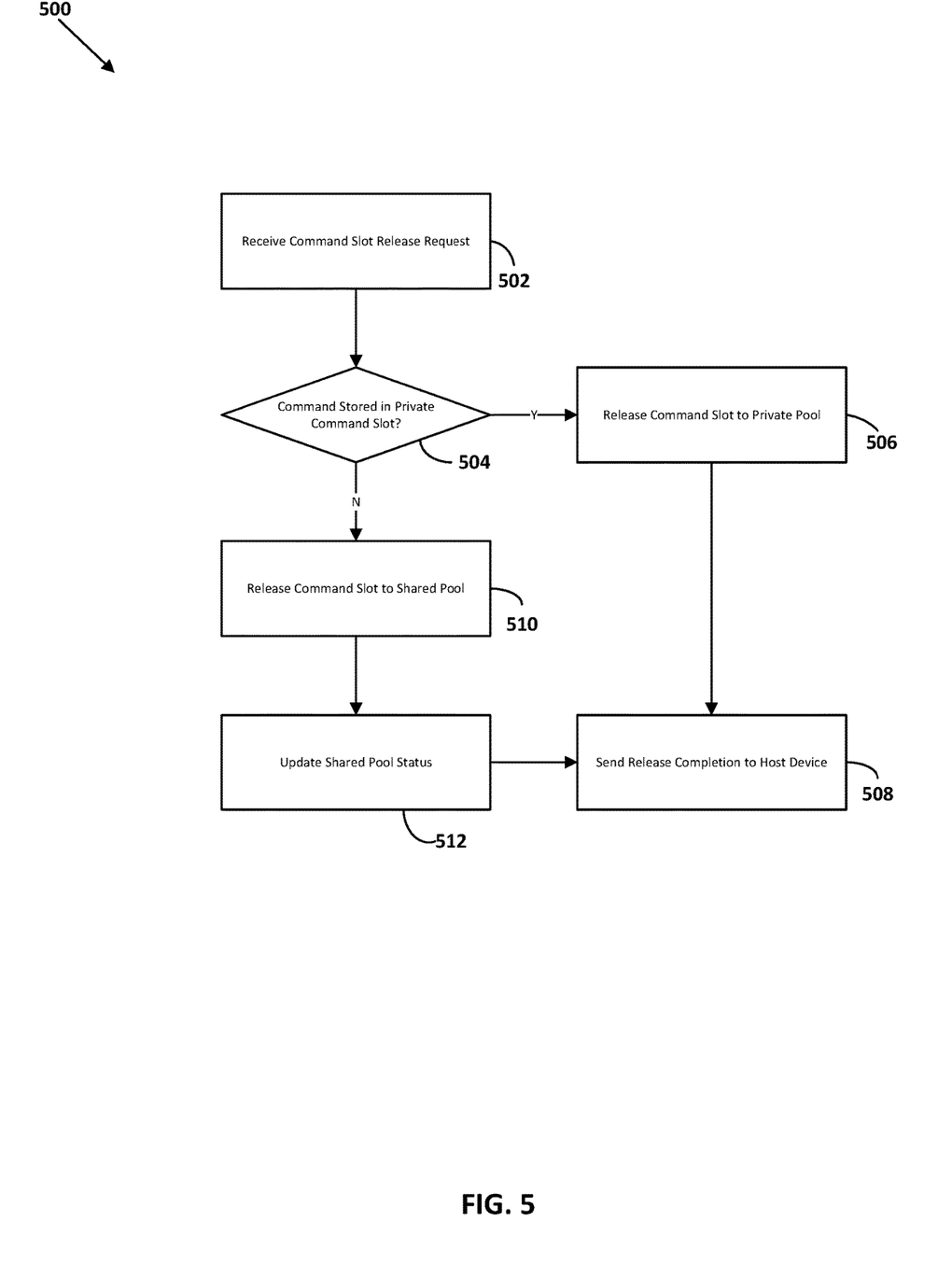
FIG. 5 is a flow chart illustrating a process for statically releasing command slots, according to some embodiments.

Turning now to FIG. 5, a process or method 500 for statically releasing a command slot is disclosed, according to some embodiments. Statically releasing a command slot is understood to mean that the command slots used by each pool (e.g. private and shared pools) are fixed and not mixed. Thus, when a command slot is taken from one of the shared pool or the private pool, it is released to that same pool. Releasing a command slot is performed once the command is executed. For example, a target endurance group may execute a command stored in either a private command slot associated with the target endurance group or a shared command slot, such as via a read/write module of a memory device. Once the command is executed, it can be released (e.g. erased) from a command slot.

As illustrated in FIG. 5, a command slot release request is received by the controller 106 from the target endurance group which executed the command by the controller 106 at block 502. In other embodiments, the controller 106 and/or processor 124 may generate the command slot release request in response to successfully executing the command within the target endurance group. The controller 106 and/or processor 124 may then transmit the command slot release request to the command slot manager 128 for processing. In one embodiment, the command slot release request is received by the host device 108 via the controller 106. Upon receiving the command slot release request, the command slot manager 128 determines whether the completed command is stored in a private command slot associated with the target endurance group (e.g. the endurance group which executed the command) at block 504.

In response to determining that the completed command is stored in a private command slot, the command slot manager releases the private command slot associated with the completed command to the private command slot pool for the target endurance group at block 506. In one embodiment, releasing the private command slot includes erasing the completed command from the private command slot. The command slot manager 128 may further update the configuration/status block associated with the target endurance group to update the number of available private command slots for the target endurance group. The configuration/status block may further be updated with a duration of how long the command had been stored in the private command slot, etc. Upon the private command slot being released, a release completion message is provided to the host device 108 indicating that the command has been completed and released at block 508.

In response to determining that the completed command is not stored in a private command slot, the command slot manager releases the shared command slot to the shared command slot pool at block 510. In one embodiment, releasing the shared command slot includes erasing the command from the shared command slot. The command slot manager 128 updates a shared pool status at block 512. Updating the shared pool status may include updating the number of available/allocated shared command slots in the shared command slot pool. Additionally, the command slot manager 128 may update a configuration/status block associated with the target endurance group to update the number of shared command slots currently allocated to the target endurance group. The command slot manager 128 then transmits a release completion message to the host device 108 indicating that the command has been completed and released at block 508.

Figure 6:
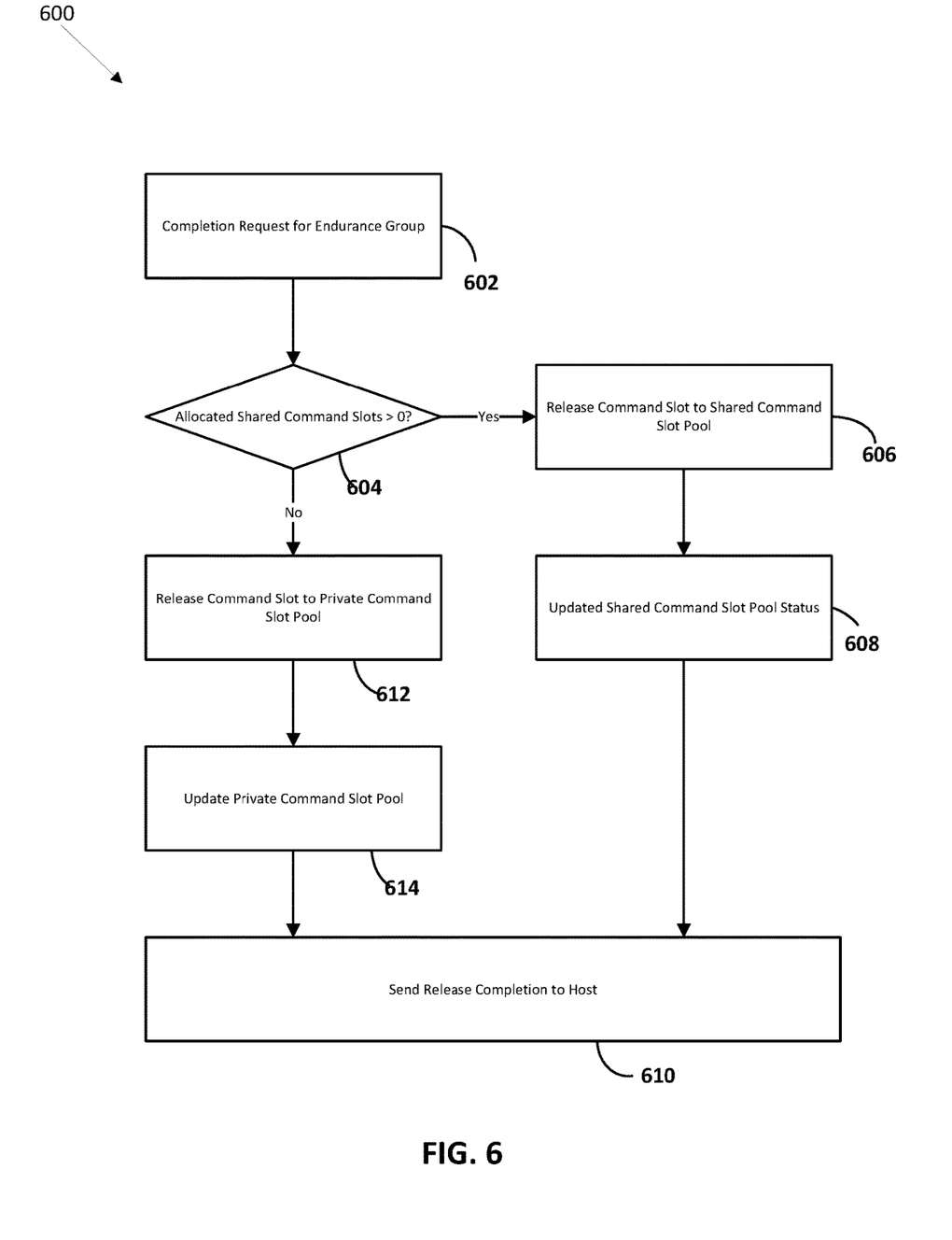
FIG. 6 is a flow chart illustrating a process for dynamically releasing command slots, according to some embodiments.

Turning now to FIG. 6, a process or method 600 for dynamically releasing a command slot is disclosed, according to some embodiments. Dynamically releasing a command slot is understood to mean than a command slot that is allocated form one pool (e.g. shared or private) might be released to another pool (e.g. shared or private). Thus, the command slots are mixed and not permanently assigned to either the shared command slot pool or one of the private command slot pools. A command completion request is received by the controller 106 from the target endurance group which executed the command at block 602. In other embodiments, the controller 106 and/or processor 124 may generate the completion request in response to successfully executing the command within the target endurance group. The controller 106 and/or processor 124 may then transmit the completion request to the command slot manager 128 for processing. In one embodiment, the command completion request is received by the host device 108 via the controller 106. Upon receiving the command completion request, the command slot manager 128 determines whether the number of allocated shared command slots assigned to the target endurance group in the shared command slot pool is greater than zero at block 604. The allocated shared command slots do not have to be allocated to the target endurance group but allocated to any endurance group associated with the controller 106.

In response to determining that the number of allocated shared command slots in the shared command slot pool is greater than zero, the command slot manager releases the command slot associated with the completed command to the shared command pool at block 606. In one embodiment, releasing the command slot to the shared pool includes assigning the command slot that stored completed command to the shared pool, regardless of whether the command slot was previous associated with a private command slot pool. For example, the command slot address may be assigned to the shared pool by the command slot manager. By releasing command slots to the shared pool as a priority, the command slot manager 128 works to ensure that the shared command slot pool is prioritized to aid in reducing performance and/or QOS of any one endurance group. Upon the shared command slot being released, the command slot manager 128 updates a shared command slot pool status at block 608. Updating the shared command slot pool status may include updating the number of available/allocated shared command slots in the shared command slot pool. Additionally, the command slot manager 128 may also update a configuration/status block associated with the target endurance group to update the number of shared command slots current allocated to the target endurance group. The command slot manager 128 then transmits a release completion message to the host device 108 indicating that the command has been completed and released at block 610.

In response to determining that the allocated shared command slots in the shared command slot pool is not greater than zero (e.g. no shared command slots are allocated), the command slot manager releases the command slot associated with the completed command to a private command slot pool associated with the target endurance group at block 612. The private command slot pool associated with the target endurance group is updated at block 614. For example, updating the private command slot pool associated with the target endurance group may include updating a quantity of allocated command slots within the private command slot pool associated with the target endurance group. The configuration/status block associated with the target endurance group may also be updated with a duration of how long the command had been stored in the command slot, etc. Upon the private command slot being released, a release completion message is provided to the host device 108 indicating that the command has been completed and released at block 610.

Figure 7:
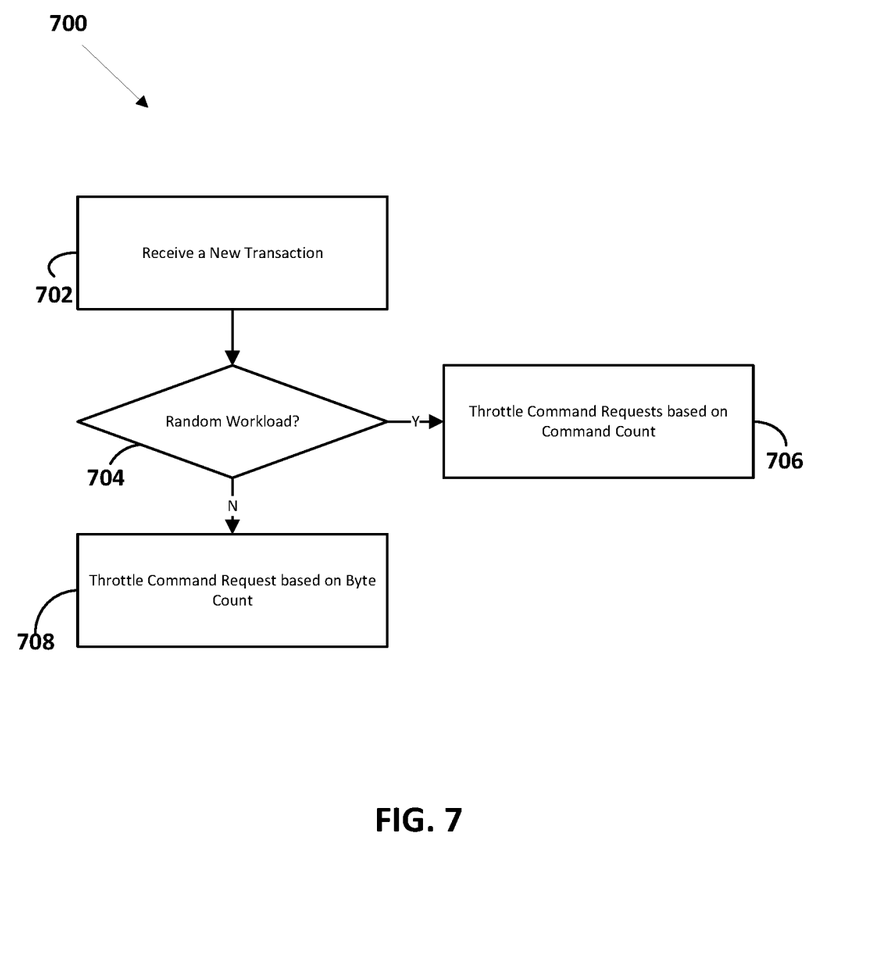
FIG. 7 is a flow chart illustrating throttling received commands from a host device, according to some embodiments.

Turning now to FIG. 7, a process or method 700 for throttling commands for a given endurance group is disclosed, according to some embodiments. During operation of a data storage device, such as data storage device 102, the host may send multiple, sequential commands to a specific endurance group of the data storage device. However, based on the quantity of commands to the specific endurance group, the controller 106 may not be capable of fetching the requested commands and/or have the capacity to fetch the requested commands at a given time. As noted above, commands can vary in size. However, the number of command slots is fixed, and therefore multiple small commands can present performance issues for the data storage device as they can quickly fill up multiple command slots within the data storage device, thus it is advantageous to be able to throttle or manage the commands being fetched for a given endurance group.

As illustrated in FIG. 7, a new transaction is received by a data storage device from a host device at block 702. The transaction may be a series of commands to be executed or fetched by data storage device. A controller, such as controller 106 described above, determines if the transaction includes a random workload at block 704. A random workload may be determined based on the size of the commands associated with the transaction. For example, a random workload may be determined when the size of the commands is 4 kb or less. However, values of more than 4 kb or less than 4 kb are also contemplated. In determining that the workload is random, the controller 106 determines that the commands of the transaction are small but may include a larger quantity of commands. Upon determining that the workload is random, the controller throttles command requests associated with the received transaction based on command count at block 706. Thus, the controller 106 may limit the amount of commands that are fetched based on the number of requested commands. In some examples, the controller 106 limits the amount of commands that are fetched based on a size of the command (e.g. byte count) and/or the level of data transfer bandwidth needed to communicate the command. As the commands in a random workload are small, large numbers of commands may be received by the controller, where only limited number of command slots are available. By throttling the command requests, the controller 106 takes only some of the commands at a given time based on the current workload of the data storage device. For example, if there are 100 commands associated with the received transaction, the controller 106 may limit the number of concurrent commands stored in the command slots to a reduced number, such as 20. In some embodiments, the number of current commands stored in the command slots may be determined based on a total number of available command slots, the number of endurance groups, etc.

In response to the controller determining that the workload is not random, the controller 106 throttles the commands based on a size (e.g. byte count) of the commands. For example, larger commands may take longer to complete, and/or may require multiple command slots. Thus, the controller 106 may fetch the commands associated with the transaction based on their size to prevent performance degradation due to executing multiple large commands on a single endurance group at any one time. Thus, by analyzing the workload, the controller can effectively manage commands associated with a transaction to reduce performance or QoS degradation.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
   a non-volatile memory device including a plurality of non-volatile memory sets and a plurality of endurance groups, wherein each endurance group of the plurality of endurance groups includes at least one of the plurality of non-volatile memory sets, and wherein the each endurance group is grouped together for wear-leveling across a portion of the plurality of non-volatile memory sets that is included in the each endurance group, the portion being less than all of the plurality of non-volatile memory sets; and
   a controller coupled to the non-volatile memory device and configured to:
      receive a pending command message from a host interface, wherein the received pending command message includes a command configured to be executed by a first endurance group of the plurality of endurance groups;
      determine an assigned command slot for storing the command, wherein the assigned command slot is selected from one of two command slot pools of the non-volatile memory device, the two command slot pools including a private command slot pool associated with the first endurance group and a shared command slot pool that is shared by two or more of the plurality of endurance groups;
      fetch the command from a host device; and
      store the fetched command in the assigned command slot;
      determine whether a number of shared command slots assigned to commands configured to be executed by the first endurance group exceeds a predetermined threshold; and
      deny a shared command slot from being assigned to the first endurance group in response to determining that the number of shared command slots assigned to commands associated with the first endurance group exceeds the predetermined threshold.

2. The data storage device of claim 1, wherein, to determine the assigned command slot for storing the command, the controller is further configured to:
determine whether one or more private command slots are available within the private command slot pool associated with the first endurance group;
assign the fetched command to a first private command slot within the private command slot pool associated with the first endurance group in response to determining that the first private command slot is available within the private command slot pool associated with the first endurance group;
determine whether one or more shared command slots are available within the shared command slot pool in response to determining that no private command slots are available within the private command slot pool associated with the first endurance group; and
assign the fetched command to a first shared command slot within the shared command slot pool in response to determining that the first shared command slot is available within the shared command slot pool.

3. The data storage device of claim 1, wherein the controller is further configured to:
receive a command completion request for a first command;
determine a first command slot associated with the first command;
determine whether the first command slot is a private command slot;
release the first command slot to the private command slot pool associated with the private command slot in response to determining that the first command slot is the private command slot; and
release the first command slot to the shared command slot pool in response to determining that the first command slot is not the private command slot.

4. The data storage device of claim 3, wherein the controller is further configured to update a shared command slot pool status in response to releasing the first command slot to the shared command slot pool, wherein updating the shared command slot pool status includes updating a number of commands assigned to command slots in the shared command slot pool.

5. The data storage device of claim 1, wherein the controller is further configured to:
receive a command completion request for a first command, wherein the first command is stored in a first command slot;
determine whether one or more shared command slots in the shared command slot pool are allocated, wherein a shared command slot is determined to be allocated based on the shared command slot storing a second command;
release the first command slot to the shared command slot pool in response to determining that the one or more shared command slots are allocated; and
release the first command slot to a first private command pool in response to determining that no shared command slots are allocated.

6. The data storage device of claim 5, wherein the first private command pool is assigned to an endurance group of the plurality of endurance groups that executed the first command.

7. The data storage device of claim 5, wherein the controller is further configured to:
update a status of a first private command slot pool in response to releasing the first command slot to the first private command slot pool; and
update a status of the shared command slot pool in response to releasing the first command slot to the shared command slot pool.

8. The data storage device of claim 1, wherein the shared command slot pool is accessible to and shared by each of the plurality of endurance groups,
wherein the each of the plurality of endurance groups has a minimal performance and guaranteed quality of service (QoS) that is supported by the each of the plurality of endurance groups, and
wherein the each of the plurality of endurance groups broadcasts the minimal performance and guaranteed QoS to at least one of the controller or the host device.

9. The data storage device of claim 1, wherein the predetermined threshold is equal to a number of shared command slots assigned to the first endurance group of the plurality of endurance groups.

10. A method performed by a controller coupled to a non-volatile memory device, the method comprising:
receiving a pending command message from a host interface, wherein the received pending command message includes a command configured to be executed by a first endurance group of a plurality of endurance groups;
determining an assigned command slot for storing the command, wherein the assigned command slot is selected from one of two command slot pools of the non-volatile memory device, the two command slot pools including a private command slot pool associated with the first endurance group and a shared command slot pool that is shared by two or more of the plurality of endurance groups;
fetching the command from a host device;
storing the fetched command in the assigned command slot;
determining whether a number of shared command slots assigned to commands configured to be executed by the first endurance group exceeds a predetermined threshold; and
denying a shared command slot from being assigned to the first endurance group in response to determining the number of shared command slots assigned to commands associated with the first endurance group exceeds the predetermined threshold;
wherein each endurance group of the plurality of endurance groups is grouped together for wear-leveling across a portion of a plurality of non-volatile memory sets that is included in the each endurance group, the portion being less than all of the plurality of non-volatile memory sets.

11. The method of claim 10, wherein determining the assigned command slot for storing the command comprises:
determining whether one or more private command slots are available within the private command slot pool associated with the first endurance group;
assigning the fetched command to a first private command slot within the private command slot pool associated with the first endurance group in response to determining that the first private command slot is available within the private command slot pool associated with the first endurance group;
determining whether one or more shared command slots are available within the shared command slot pool in response to determining that no private command slots are available within the private command slot pool associated with the first endurance group; and assign the fetched command to a first shared command slot within the shared command slot pool in response to determining that the first shared command slot is available within the shared command slot pool.

12. The method of claim 10, further comprising:

receiving a command completion request for a first command;

determining a first command slot associated with the first command;

determining whether the first command slot is a private command slot;

releasing the first command slot to the private command slot pool associated with the private command slot in response to determining that the first command slot is the private command slot; and releasing the first command slot to the shared command slot pool in response to determining that the first command slot is not the private command slot.

13. The method of claim 12, further comprising:

updating a shared command slot pool status in response to releasing the first command slot to the shared command slot pool, wherein updating the shared command slot pool status includes updating a number of commands assigned to command slots in the shared command slot pool.

14. The method of claim 10, further comprising:

receiving a command completion request for a first command, wherein the first command is stored in a first command slot;

determining whether one or more shared command slots in the shared command slot pool are allocated, wherein a shared command slot is determined to be allocated based on the shared command slot storing a second command;

releasing the first command slot to the shared command slot pool in response to determining that the one or more shared command slots are allocated; and releasing the first command slot to a first private command pool in response to determining that no shared command slots are allocated.

15. The method of claim 10, wherein the predetermined threshold is equal to a number of shared command slots assigned to the first endurance group of the plurality of endurance groups.

16. An apparatus, comprising:

means for receiving a pending command message from a host interface, wherein the received pending command message includes a command configured to be executed by a first endurance group of a plurality of endurance groups;

means for determining an assigned command slot for storing the command, wherein the assigned command slot is selected from one of two command slot pools of the apparatus, the two command slot pools including a private command slot pool associated with the first endurance group and a shared command slot pool that is shared by two or more of the plurality of endurance groups;

means for determining whether a number of shared command slots assigned to commands configured to be executed by the first endurance group exceeds a predetermined threshold;

means for denying a shared command slot from being assigned to the first endurance group in response to determining the number of shared command slots assigned to commands associated with the first endurance group exceeds the predetermined threshold;

means for fetching the command from a host device; and means for storing the fetched command in the assigned command slot, wherein each endurance group of the plurality of endurance groups is grouped together for wear-leveling across a portion of a plurality of non-volatile memory sets that is included in the each endurance group, the portion being less than all of the plurality of non-volatile memory sets.

17. The apparatus of claim 16, further comprising:

means for determining whether one or more private command slots are available within the private command slot pool associated with the first endurance group;

means for assigning the fetched command to a first private command slot within the private command slot pool associated with the first endurance group in response to determining that the first private command slot is available within the private command slot pool associated with the first endurance group;

means for determining whether one or more shared command slots are available within the shared command slot pool in response to determining that no private command slots are available within the private command slot pool associated with the first endurance group; and means for assigning the fetched command to a first shared command slot within the shared command slot pool in response to determining that the first shared command slot is available within the shared command slot pool.

18. The apparatus of claim 16, further comprising:

means for receiving a command completion request for a first command;

means for determining a first command slot associated with the first command;

means for determining whether the first command slot is a private command slot;

means for releasing the first command slot to the private command slot pool associated with the private command slot in response to determining that the first command slot is the private command slot; and means for releasing the first command slot to the shared command slot pool in response to determining that the first command slot is not the private command slot.

19. The apparatus of claim 16, further comprising:

means for receiving a command completion request for a first command, wherein the first command is stored in a first command slot;

means for determining whether one or more shared command slots in the shared command slot pool are allocated, wherein a shared command slot is determined to be allocated based on the shared command slot storing a second command;

means for releasing the first command slot to the shared command slot pool in response to determining that the one or more shared command slots are allocated; and means for releasing the first command slot to a first private command pool in response to determining that no shared command slots are allocated.

20. The apparatus of claim 16, wherein the predetermined threshold is equal to a number of shared command slots assigned to the first endurance group of the plurality of endurance groups.

* * * * *